United States Patent

[11] 3,572,020

| [72] | Inventor | Joseph L. Poggie<br>Massapequa, N.Y. |
|---|---|---|
| [21] | Appl. No. | 819,705 |
| [22] | Filed | Apr. 28, 1969 |
| [45] | Patented | Mar. 23, 1971 |
| [73] | Assignee | Fairchild Hiller Corporation<br>Montgomery County, Md. |

[54] FRUIT HARVESTER
6 Claims, 5 Drawing Figs.

[52] U.S. Cl. .................................................... 56/332
[51] Int. Cl. ..................................................... A01g 19/08
[50] Field of Search .......................................... 56/328, 332–340, 31, 32

[56] References Cited
UNITED STATES PATENTS

| 1,355,786 | 10/1920 | Skillins | 56/32 |
| 2,775,088 | 12/1956 | Bullock | 56/332 |
| 2,968,907 | 1/1961 | Bernheim | 56/332 |
| 3,306,019 | 2/1967 | MacCurdy | 56/332 |
| 3,420,046 | 1/1969 | Johnson et al. | 56/330 |

*Primary Examiner*—Russell R. Kinsey
*Attorney*—Michael W. York

ABSTRACT: A fruit harvester including a harvester head that comprises a hollow housing, a hollow cylindrical rotor rotatably mounted within the housing and means such as an air drive for causing the rotor to rotate. The hollow cylindrical rotor has ridges on its interior surface that strike the fruit that is to be harvested when the rotor rotates and causes the fruit to spin about its stem and be severed from the tree. A guide fence is included for placement on top of the fruit harvester head to guide the fruit into the harvester head and to keep the fruit from being thrown out of the harvester head. A flexible tube is provided for connection to the lower end of the fruit harvester head to transport the severed fruit from the harvester head.

INVENTOR.
JOSEPH L. POGGIE
BY Michael W. York
ATTORNEY

INVENTOR.
JOSEPH L. POGGIE
BY Michael W. York
ATTORNEY

INVENTOR.
JOSEPH L. POGGIE
BY Michael W. York
ATTORNEY

FRUIT HARVESTER

DISCLOSURE

This invention relates to fruit harvesters and more particularly to a fruit harvester that is capable of causing the fruit to spin about its stem until it is severed from the tree.

Mechanical fruit harvesters are highly desirable since they can reduce the amount of manual work associated with harvesting fruit and hence increase the speed of harvesting and reduce the costs of the harvesting operation. Although the advantages of mechanical fruit harvesters are well known, many difficulties have been encountered in the past in designing harvesters. Many harvesters pick not only the fruit but portions of the leaves, twigs and limbs, and hence can seriously damage fruit trees. Many harvesters remove the fruit from the tree by shaking the tree or by pulling the fruit from the tree. In many instances, when harvesting citrus fruit, this results in the plug, or the small conical-shaped mound centrally located at one end of the fruit being removed from the harvested fruit. This plug plays an extremely significant part in the preservation of citrus fruit. If the plug is pulled away from the fruit or damaged during harvesting then the picked fruit is exposed to bacterial attack. Bacterial attack on the meat of the fruit can result in the rapid decomposition of the fruit and therefore citrus fruit with damaged plugs can only be used by canneries. In view of this, citrus fruit with damaged plugs is considered to be pricewise the lowest quality of citrus fruit, whereas citrus fruit picked with the plug fully intact can be refrigerated and marketed as table fruit and commands the highest market price.

Numerous machines also lend themselves to the harvesting of only one particular type of fruit. Other machines must be altered or have parts replaced or modified when shifting from the harvesting of one type of fruit to another.

It is therefore an object of this invention to provide a fruit harvester that harvests fruit with a minimum amount of damage to the tree and the fruit.

Another object of this invention is to provide a fruit harvester that can harvest high quality citrus fruit with the plugs intact.

Another object of this invention is to provide a fruit harvester that can harvest a variety of types of fruit without alteration of the harvester.

The present invention provides a fruit harvester for harvesting fruit from fruit trees. The fruit harvester comprises a fruit harvester housing and a rotor that is rotatably mounted within the housing. Picking means are attached to interior surface of the fruit harvester rotor for striking the fruit that is to be harvested. Rotating means are also provided for causing the rotor to rotate within the housing. A guide fence is also provided for attachment to the top of fruit harvester housing for directing the fruit into the harvester and for preventing the fruit from rebounding out of the top of the harvester rotor. A flexible tube is also provided for attachment to the bottom of the harvester housing to receive the harvested fruit and transport it from the harvester.

In order that the invention may be more clearly set forth and better understood, reference is made to the accompanying drawings, in which.

Figure 1:
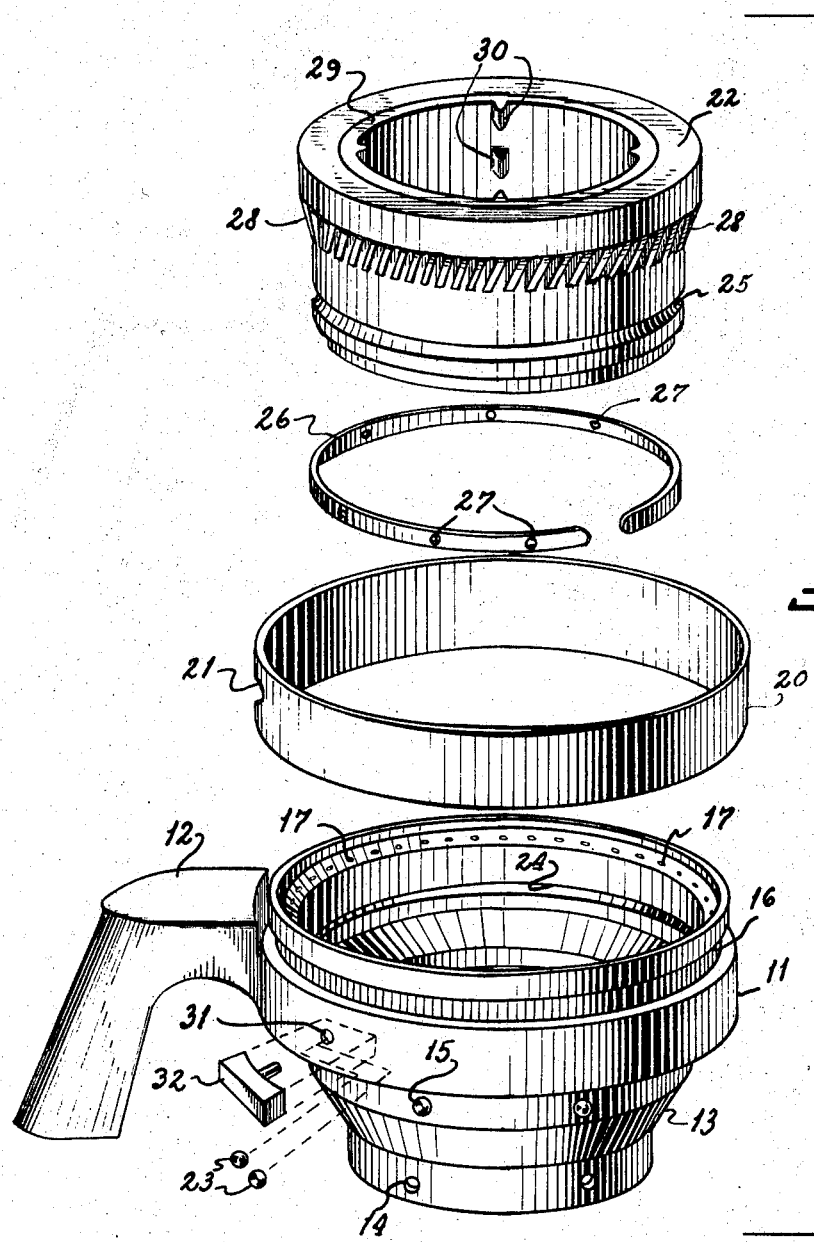
FIG. 1 is an exploded perspective view of a fruit harvester head according to the present invention.
Figure 2:
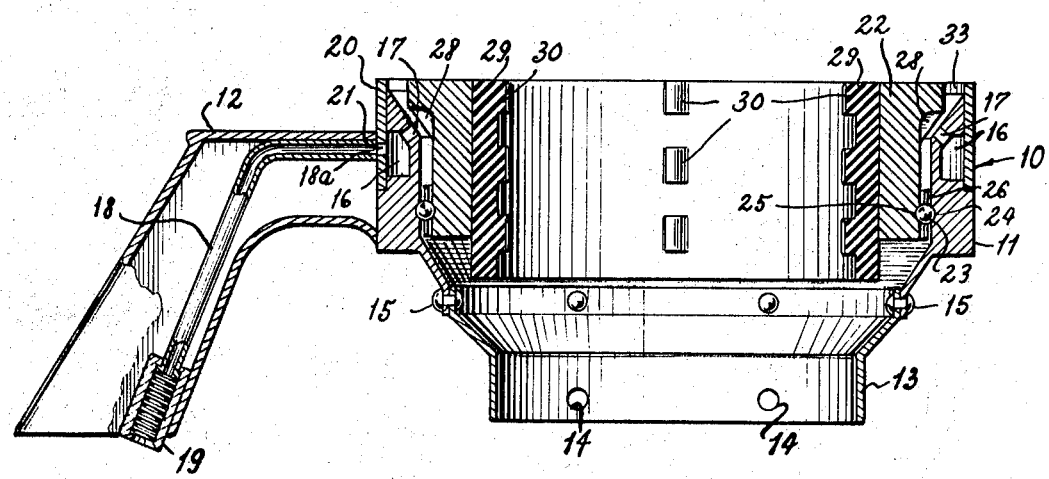
FIG. 2 is a vertical sectional view of the fruit harvester head according to the present invention taken along line 2–2 of FIG. 3.
Figure 3:
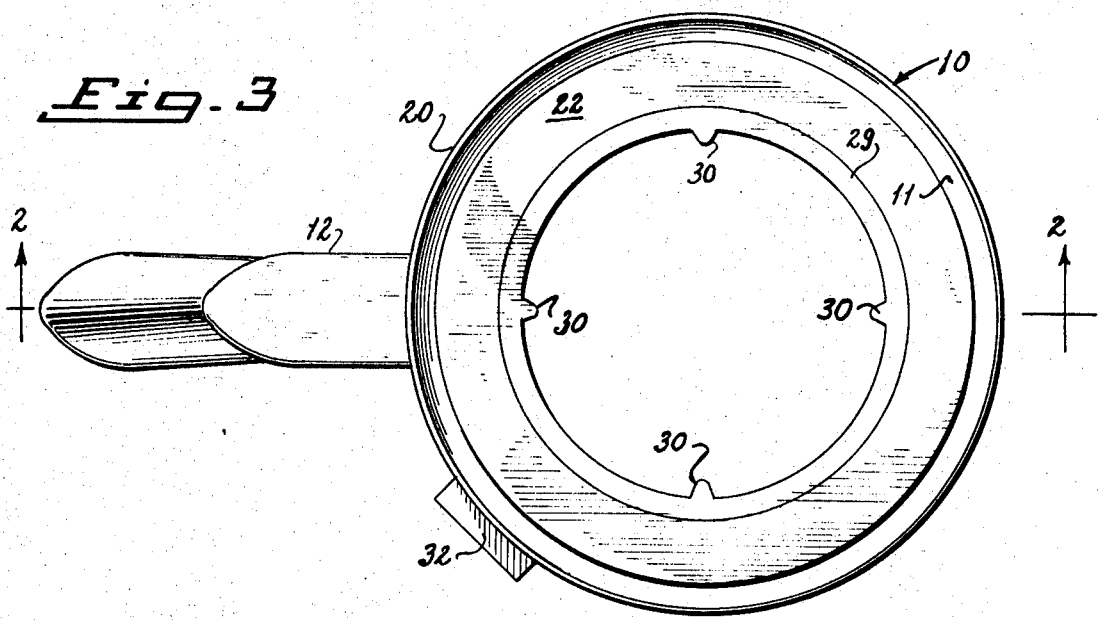
FIG. 3 is a plain view of the fruit harvester head according to the present invention.

Referring first to FIGS. 1 through 3, there is shown a fruit harvester head. This fruit harvester head 10 has a hollow, substantially cylindrical fruit harvester housing 11 with an attached handle 12. A funnel-shaped connector 13 having mounting holes 14 is connected to the bottom of the cylindrical fruit harvester housing 11 by means of the rivets 15. Located around the exterior of the fruit harvester housing 11 is an air channel 16 for the distribution of compressed air. Air portholes 17 for transmitting compressed air extend at intervals from the air channel 16 upwardly and inwardly through the housing 11. As illustrated in FIG. 2, a compressed air supply tube 18 extends from a fitting 19 inside the handle 12 to a point where compressed air can be fed into the air channel 16. An air channel sealing ring 20 having an air entrance hole 21 is designed to fit around the upper portion of the fruit harvester housing 11 to seal the air channel 16. When the air channel sealing ring 20 is properly seated the air entrance hole 21 is directly opposite the exit orifice 18a (see FIG. 2) of the air supply tube 18 in the handle 12 and this permits passage of compressed air through the air supply tube 18 into the air channel 16. A hollow substantially cylindrical fruit harvester rotor 22 is rotatably mounted within the housing 11 on polytetrafloroethylene ball bearings 23 that ride in a bearing race 24 located around the interior of the housing 11 and in a bearing race 25 located around the exterior of the rotor 22. The ball bearings 23 are kept at fixed distances from each other as they ride in the bearing races 24 and 25 by a polytetrafloroethylene bearing separator strip 26 that is located between the bearing race 24 located on the interior of the housing 11 and the bearing race 25 located around the exterior of the cylindrical rotor 22 and has holes 27 for receiving the bearings. Air impinging means comprising vanes 28 are located around the upper periphery of the cylindrical rotor 22 that are designed to be struck by the compressed air that exits the air portholes 17 in the housing 11 and to cause the rotor to rotate under the influence of the compressed air.

A picking insert 29 having picking ridges 30 fits snugly within the fruit harvester rotor 22. The size and number of the picking ridges can be varied to a considerable extent without adversely effecting the operation of the fruit harvester. However, these picking ridges should be uniformly dispersed around the interior of the picking insert 29 for best results. It has been discovered that a uniform array of four sets of three vertically aligned picking ridges provides good results. The inside diameter of the picking insert 29 can be varied considerably to suit the type of fruit that is to be picked. Generally, the inside diameter of the picking insert when measured from the tips of the picking ridges 30 should be at least 1½ times the diameter of the fruit that is to be picked. The picking insert including the picking ridges must be made of a resilient or flexible material, preferably rubber, or a rubberized fabric.

In order to permit installation and removal of the ball bearings 23 a bearing access port 31 (see FIG. 1) extends through the fruit harvester housing 11 to the bearing race 24. Normally, the bearing access port 31 is closed by the bearing access port closure 32. As is best seen in FIG. 1, bearing installation or removal is accomplished by removing the bearing access port closure 32 and rotating the rotor 22 to cause the bearing separator 26 to rotate until the hole 27 lines up with the bearing access port 31. The bearing 23 is then either removed or installed through the bearing access port 31. This process can be repeated until all of the bearings have been removed or installed.

The operation of the fruit harvester head is best understood by referring to FIG. 2. Compressed air is fed into air supply tube 18 by means of the fitting 19 from a source of compressed air such as an air compressor (not shown). This compressed air travels through the air supply tube 18 and through the air entrance hole 21 in the air channel sealing ring 20. This compressed air then travels around the air channel 16 and exits through the air portholes 17. The jets of compressed air that leave the air portholes 17 then strike the vanes 28 and cause the rotor 22 and the picking insert 29 to rotate. After the compressed air has struck the vanes 28, it exits the picking head 10 through the gap 33 that exists between the rotor 22 and the air channel sealing ring 20. Upon being brought in contact with the fruit, the rotating picking ridges 30 will cause the fruit to spin about its stem until the fruit is severed from the tree with the aid of gravity. After the fruit has been severed from the tree it falls through the picking insert 29 and through the funnel-shaped connector 13.

Figure 4:
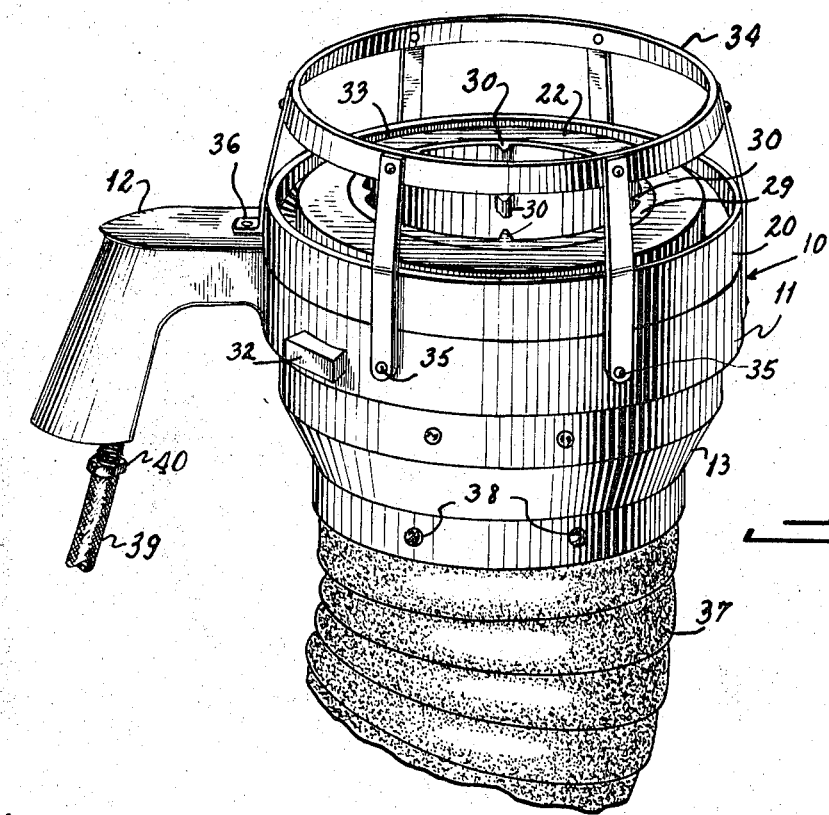
FIG. 4 is a perspective view of the fruit harvester head according to the present invention with a guide fence, air hose, and flexible tube attached thereto.

In FIG. 4, a further form of the invention is illustrated wherein a guide fence 34 is located around the entrance to the picking insert 29 and connected to the housing 11 by screws 35 and to the handle 12 by the screw 36. The guide fence 34 guides the fruit into the entrance to the picking insert 29 and serves to prevent the fruit from rebounding out of the picking insert when it is struck by the rotor ridges 30. A flexible tube 37 is also shown that is connected to the funnel-shaped connector 13 by screws 38 that serves to receive and transport the severed fruit. A compressed air supply hose 39 is also shown connected to the handle 12 by the hose fitting 40.

Figure 5:
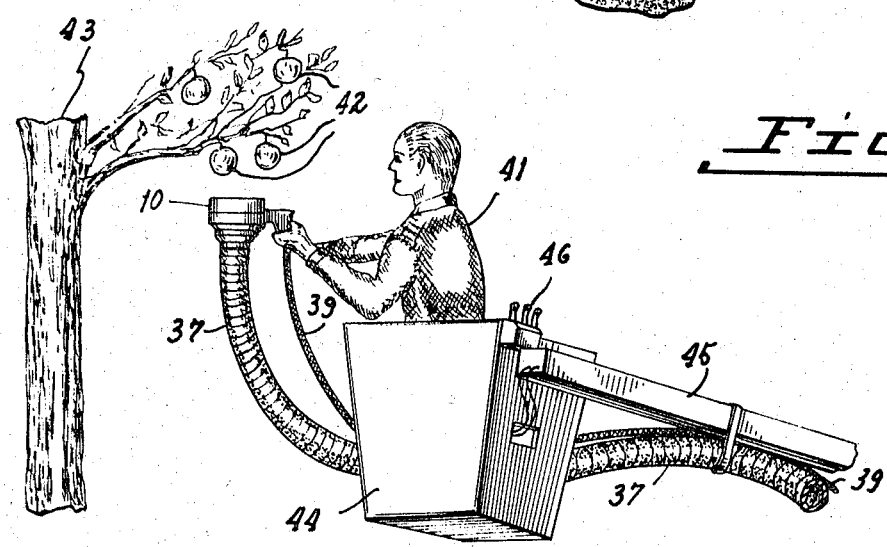
FIG. 5 is a schematic view of the device of this invention being employed for picking fruit from trees.

FIG. 5 illustrates the fruit harvester device of this invention being used to harvest fruit. FIG. 5 shows a fruit harvester head 10 being used by an operator 41 to harvest fruit 42 from the tree 43. The operator 41 is located in bucket 44 that is attached to a boom 45 that can be attached to a vehicle (not shown) located on the ground. Controls 46 are provided for moving the bucket 44 to various locations about the tree 43 and for varying the amount of compressed air supplied by an air supply (not shown) to the fruit harvester head 10 through the air hose 39. A tube 37 is connected to the harvester head 10 to transport the harvested fruit either to a vehicle mounted conveyor belt system (not shown) or to packing cases (not shown) positioned on the ground. In harvesting the fruit, the operator 41 positions himself at a suitable location near the tree 43 by means of the controls 46 and then he pushes the harvester head 10 upward and into the fruit 42.

The unique fruit harvesting rotor 29 and the picking ridges 30 of the fruit harvester head of this invention allow the harvesting of fruit with little or no damage to the fruit. Since the picking ridges 30 of the fruit harvester are made of a resilient material they are flexible and do not tend to damage the fruit upon impact. Since the inside diameter of the picking insert is larger than the fruit that is being harvested, the fruit is free to rebound from the picking ridges 30. In addition, since the picking ridges do not positively grip or hold the fruit, the operator can move the fruit harvesting head around without exerting a force upon the fruit that might damage the fruit.

The fruit harvesting head of this invention also allows harvesting of the fruit with a minimal amount of damage to the tree. Since the fruit harvesting rotor 29 and the picking ridges 30 do not positively grip or hold the fruit, the leaves, twigs and branches of the fruit tree do not tend to be caught between the fruit and the picking ridges 30, and thus the fruit harvester does not tend to grab or snag any leaves, twigs or branches of the tree. Since the picking ridges 30 are made of a resilient material such as rubber, damage by impact with the tree is also reduced.

The fact that the fruit harvester of this invention is driven by air contributes to the fruit harvester's flexibility and effectiveness. With the air driving means of this invention, there is no direct connection of the fruit harvesting rotor 22 to the source of the driving power such as would be the case with motors and associated gears or belts. This lack of a direct connection allows the fruit harvesting rotor 22 to give to some extent when significant resistence is encountered. This ability to give means that the fruit is less likely to be damaged by the picking ridges 30 of the picking insert 29 of the harvesting rotor 22. This also means that there is less likely to be damage to the fruit tree. The use of air to power the fruit harvester of this invention also allows the fruit harvester of this invention to be easily used on a variety of types of fruit. Generally, different types of fruit must be spun at different speeds in order to attain proper harvesting. These different requirements can easily be met by controlling the amount of compressed air that is injected into the fruit harvester head 10 and hence the speed of the harvesting rotor 22.

Other suitable means than the air driving system can be used to drive the fruit harvesting rotor 22 without departing from the spirit of the present invention. An example of such means would be a friction drive or an electric motor and a suitable clutch system for disengaging the fruit harvesting rotor 22 from the electric motor when the fruit harvesting rotor encounters significant resistence. Other similar means will be obvious to those skilled in the art.

The fruit harvester of this invention can be used to harvest a wide variety of fruit such as oranges, grapefruit, apples, pears, peaches and the like. However, the fruit harvester of this invention is especially useful for harvesting citrus fruit, since this fruit harvester spins the fruit about its stem until the citrus fruit is severed from the tree above the plug. This permits the fruit harvester of this invention to harvest high quality citrus fruit with the plug fully intact.

Although the invention has been described in considerable detail with reference to certain preferred embodiments, it will be understood that variations and modifications may be made within the spirit and scope of the invention as defined in the appended claims.

I claim:

1. A fruit harvester for harvesting fruit from fruit trees comprising a hollow fruit harvester housing, a hollow substantially cylindrical rotor rotatably mounted within said fruit harvester housing, a plurality of resilient ridges attached to the interior of said rotor, said ridges being adapted to strike said fruit and cause said fruit to spin and be severed from said fruit trees, said hollow rotor having an interior diameter measured from the tips of said ridges that is substantially greater than the diameter of said fruit that is to be harvested, and rotating means connected to said rotor for rotating said rotor.

2. The fruit harvester of claim 1 wherein the interior diameter of said rotor measured from the tips of said ridges is at least 1½ times the diameter of said fruit that is to be harvested.

3. The fruit harvester of claim 2 wherein said fruit harvester housing has air passages for permitting compressed air to pass from the exterior to the interior of said fruit harvester housing and wherein said rotating means includes air impinging means located on the exterior of said rotor that are adapted to be struck by compressed air that passes through said air passages.

4. The fruit harvester of claim 3 wherein said air impinging means comprises a plurality of vanes.

5. The fruit harvester of claim 1 including a handle connected to said fruit harvester housing.

6. The fruit harvester of claim 1 including a guide fence attached to said fruit harvester housing for guiding said fruit into said fruit harvester rotor.